(12) United States Patent
Usami et al.

(10) Patent No.: US 10,357,956 B2
(45) Date of Patent: Jul. 23, 2019

(54) SHAPING APPARATUS AND SHAPING METHOD

(71) Applicant: CANON KABUSHIKI KAISHA, Tokyo (JP)

(72) Inventors: Hirokazu Usami, Yokohama (JP); Tatsuya Tada, Yokohama (JP); Kenji Karashima, Tokyo (JP); Genya Anan, Inagi (JP); Takashi Kase, Tokyo (JP); Satoru Yamanaka, Kawasaki (JP); Yuji Wakabayashi, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/427,405

(22) Filed: Feb. 8, 2017

(65) Prior Publication Data
US 2017/0232673 A1 Aug. 17, 2017

(30) Foreign Application Priority Data

Feb. 15, 2016 (JP) .................................. 2016-025809

(51) Int. Cl.
| | | |
|---|---|---|
| B32B 41/00 | (2006.01) |
| B33Y 10/00 | (2015.01) |
| B33Y 30/00 | (2015.01) |
| B33Y 50/02 | (2015.01) |
| B29C 35/02 | (2006.01) |
| B29C 35/16 | (2006.01) |
| B29C 67/00 | (2017.01) |
| B29K 101/12 | (2006.01) |

(52) U.S. Cl.
CPC .......... *B33Y 10/00* (2014.12); *B29C 35/0288* (2013.01); *B29C 35/16* (2013.01); *B29C 67/0081* (2013.01); *B29C 67/0088* (2013.01); *B29C 67/0092* (2013.01); *B33Y 30/00* (2014.12); *B33Y 50/02* (2014.12); *B29K 2101/12* (2013.01)

(58) Field of Classification Search
CPC ............ B29C 67/0081; B29C 35/0288; B29C 67/0092; B29C 67/0088; B29C 35/16; B33Y 50/02; B33Y 30/00; B33Y 10/00; B29K 2101/12
USPC .......................... 156/64, 350, 351, 378, 379
See application file for complete search history.

(56) References Cited

U.S. PATENT DOCUMENTS

| | | | |
|---|---|---|---|
| 2013/0053995 A1* | 2/2013 | Hashimoto | ......... B29C 67/0051 700/97 |
| 2013/0078013 A1 | 3/2013 | Chillscyzn et al. | |
| 2015/0273765 A1 | 10/2015 | Kato et al. | |

* cited by examiner

*Primary Examiner* — Michael N Orlando
*Assistant Examiner* — Joshel Rivera
(74) *Attorney, Agent, or Firm* — Venable LLP

(57) ABSTRACT

A shaping apparatus includes a storage section that stores in advance a first relationship between a temperature of a shaping material and a heating time at a time at which oxidation of the shaping material starts as the shaping material is heated; and a control section that estimates a timing at which the oxidation of a material layer starts, based on an acquisition result from a temperature acquisition section, a measurement result from a time measurement section, and the first relationship stored in the storage section when the material layer on a conveyance body is preheated by a preheating section, and reduces a front surface temperature of the material layer on the conveyance body before the oxidation of the material layer starts.

23 Claims, 11 Drawing Sheets

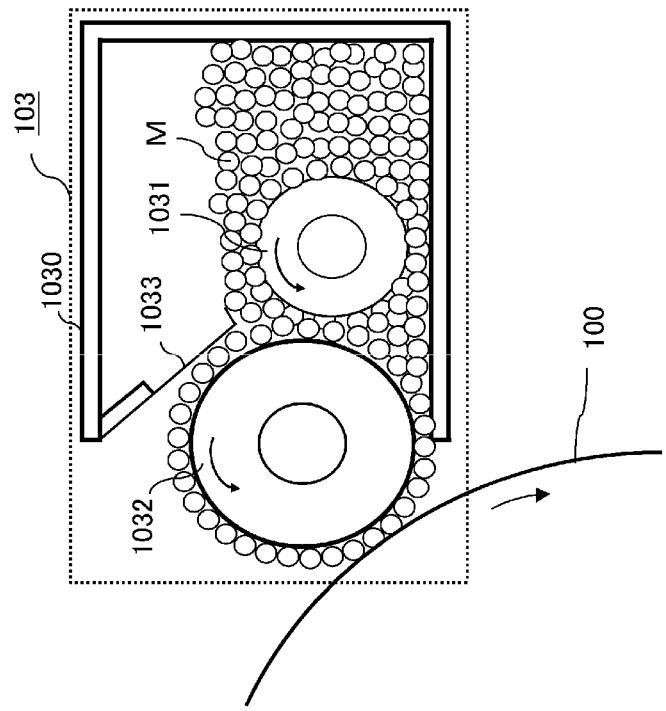
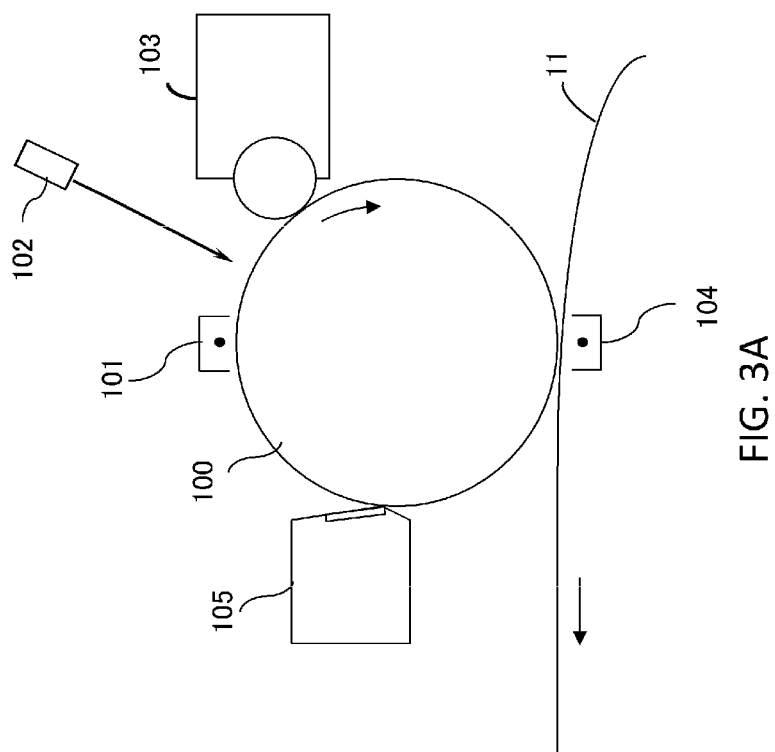
FIG. 3B
FIG. 3A

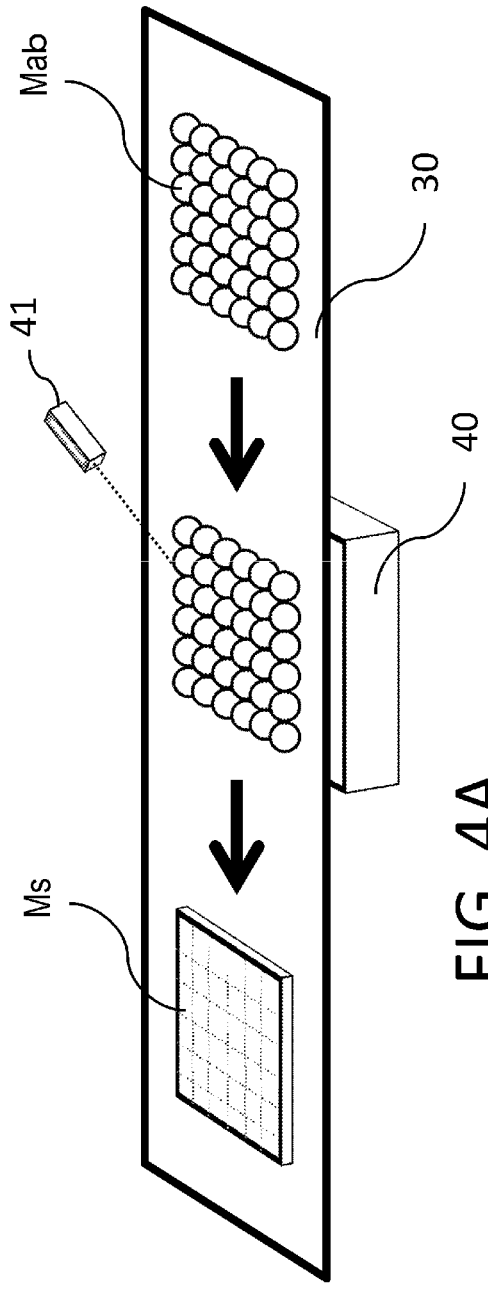
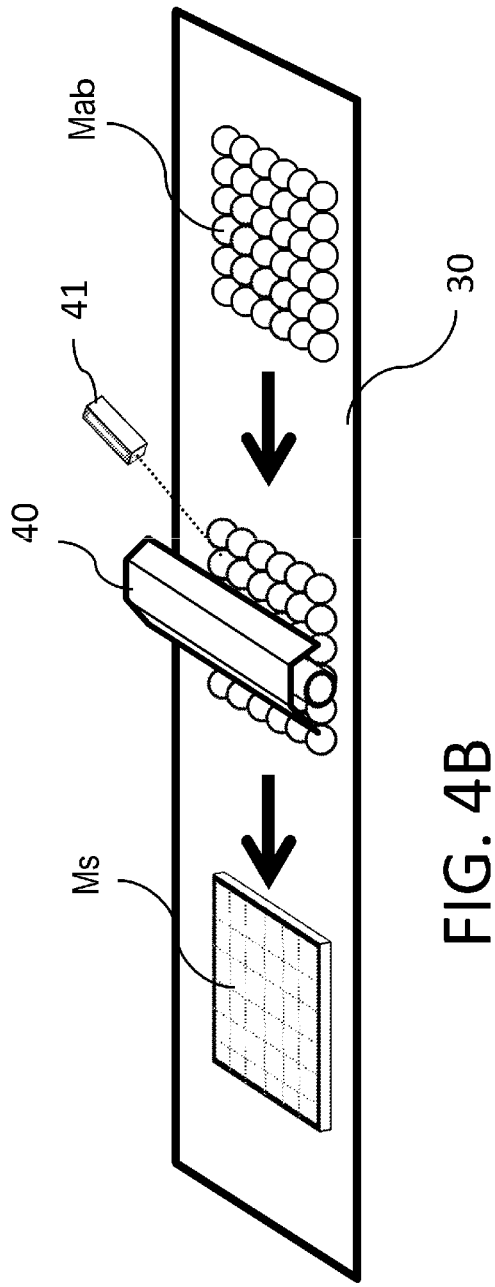
FIG. 4A
FIG. 4B

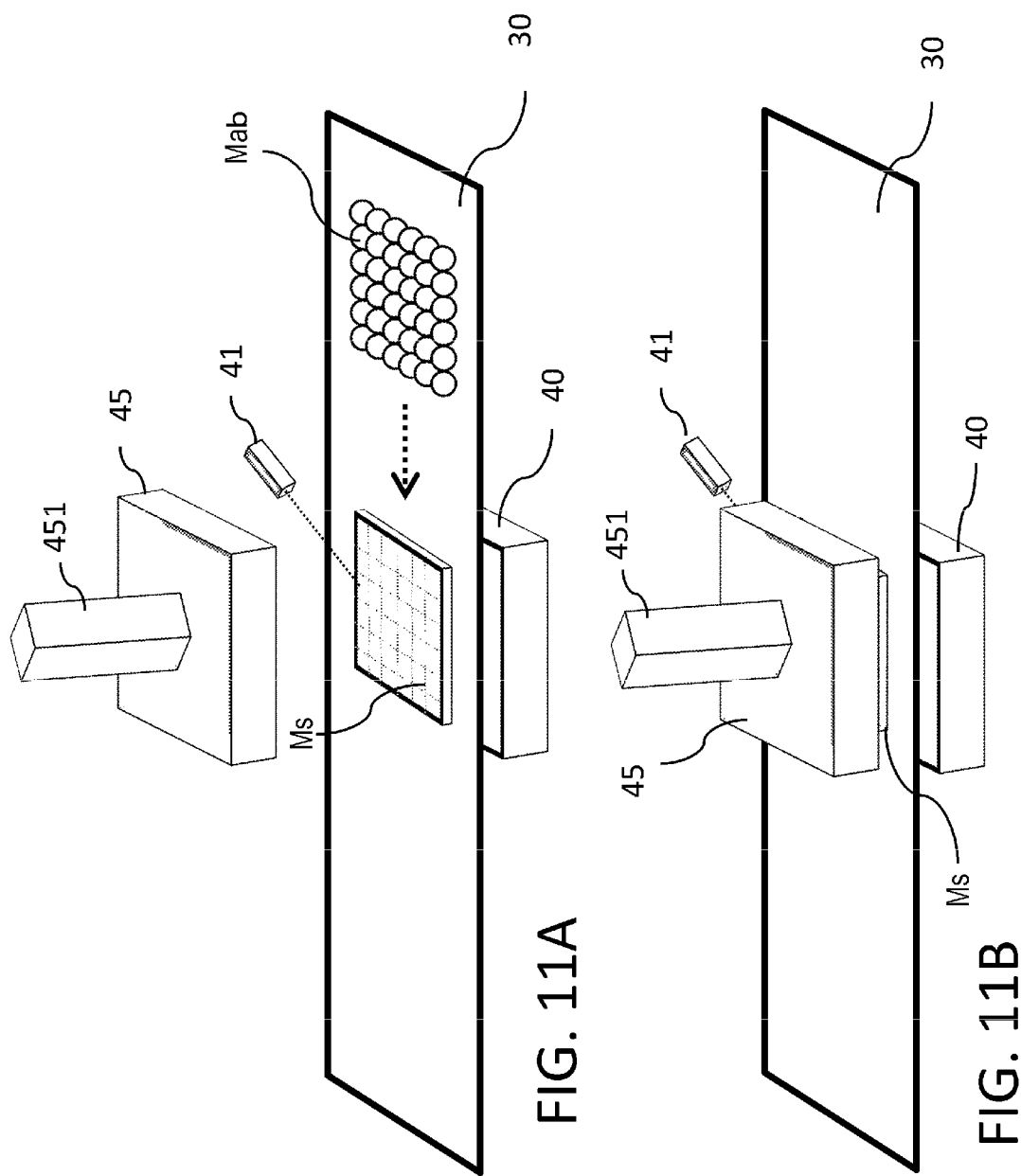

SHAPING APPARATUS AND SHAPING METHOD

BACKGROUND OF THE INVENTION

Field of the Invention

The present invention relates to a shaping apparatus and a shaping method.

Description of the Related Art

In recent years, a three-dimensional shaping technique called additive manufacturing (AM), a three-dimensional printer, and rapid prototyping (RP) have been attracting attention (these techniques are collectively referred to as AM technology in the instant specification.)

The AM technology is a technology of slicing three-dimensional shape data relating to a shaping target object to generate a plurality of slice data, forming, based on the respective slice data, material layers (material images) using a shaping material, and successively stacking the material layers upon a stage and fixing same so as to shape a solid object.

US Patent Application Publication No. 2013/0078013 (Specification) proposes a technology of heating thermoplastic base powder (shaping material) up to a melting temperature and then stacking layers, using a sheet-stacking-type shaping apparatus.

SUMMARY OF THE INVENTION

With the above conventional technology, however, there is a concern about oxidation of the melted shaping material. Oxidation of the material layer may result in deterioration of the physical properties of the shaping material or a change in color of the shaping material, as well as stacking failure caused by the shaping material sticking to a conveyance body.

The present invention has been made in view of the above circumstances and has an object of suppressing oxidation of a shaping material when the shaping material is heated.

The present invention in its first aspect provides a shaping apparatus that stacks a material layer formed of a shaping material to fabricate a solid object, the shaping apparatus comprising: a material layer forming section that forms the material layer based on slice data; a conveyance body that conveys the material layer formed by the material layer forming section; a stage on which the material layer conveyed by the conveyance body and heated by a heating section is stacked; a preheating section that preheats the material layer on the conveyance body before being heated by the heating section; a temperature acquisition section that acquires a front surface temperature of the material layer preheated by the preheating section; a time measurement section that measures a time at which the material layer on the conveyance body is preheated by the preheating section; a storage section that stores in advance a first relationship between a temperature of the shaping material and a heating time at a time at which oxidation of the shaping material starts as the shaping material is heated; and a control section that estimates a timing at which the oxidation of the material layer starts, based on an acquisition result from the temperature acquisition section, a measurement result from the time measurement section, and the first relationship stored in the storage section when the material layer on the conveyance body is preheated by the preheating section, and reduces the front surface temperature of the material layer on the conveyance body before the oxidation of the material layer starts.

The present invention in its second aspect provides a shaping method using a shaping apparatus that stacks, based on slice data, a material layer formed of a shaping material to fabricate a solid object, the shaping apparatus having a material layer forming section that forms the material layer based on the slice data, a conveyance body that conveys the material layer formed by the material layer forming section, a stage on which the material layer conveyed by the conveyance body and heated by a heating section is stacked, a preheating section that preheats the material layer on the conveyance body before being heated by the heating section, a temperature acquisition section that acquires a front surface temperature of the material layer preheated by the preheating section, a time measurement section that measures a time at which the material layer on the conveyance body is preheated by the preheating section, and a storage section that stores in advance a first relationship between a temperature of the shaping material and a heating time at a time at which oxidation of the shaping material starts as the shaping material is heated, the shaping method comprising: estimating a timing at which the oxidation of the material layer starts, based on an acquisition result from the temperature acquisition section, a measurement result from the time measurement section, and the first relationship stored in the storage section when the material layer on the conveyance body is preheated by the preheating section; and reducing the front surface temperature of the material layer on the conveyance body before the oxidation of the material layer starts.

The present invention in its third aspect provides a shaping method for stacking a shaping material based on slice data to fabricate a solid object, the shaping method comprising: a material arranging step of arranging the shaping material based on the slice data; and a heating step of heating the shaping material in a state in which a stacked front surface of the shaping material is exposed to air, wherein in the heating step, a time at which the shaping material is heated and a front surface temperature of the shaping material exposed to the air are acquired, and oxidation characteristics expressed by a temperature and a heating time at a time at which oxidation of the shaping material starts are referred to stop heating the shaping material before oxidation of the shaping material starts.

According to an embodiment of the present invention, it is possible to suppress the oxidation of a shaping material when the shaping material is heated.

Further features of the present invention will become apparent from the following description of exemplary embodiments with reference to the attached drawings.

BRIEF DESCRIPTION OF THE DRAWINGS

FIGS. 3A and 3B are diagrams for describing the configuration of the material layer forming unit of the first embodiment;

FIGS. 4A and 4B are schematic perspective diagrams for describing the configuration of the preheating unit of the first embodiment;

FIGS. 11A and 11B are schematic cross-sectional diagrams showing the surroundings of the preheating unit of the shaping apparatus according to a fourth embodiment.

DESCRIPTION OF THE EMBODIMENTS

Figure 1:
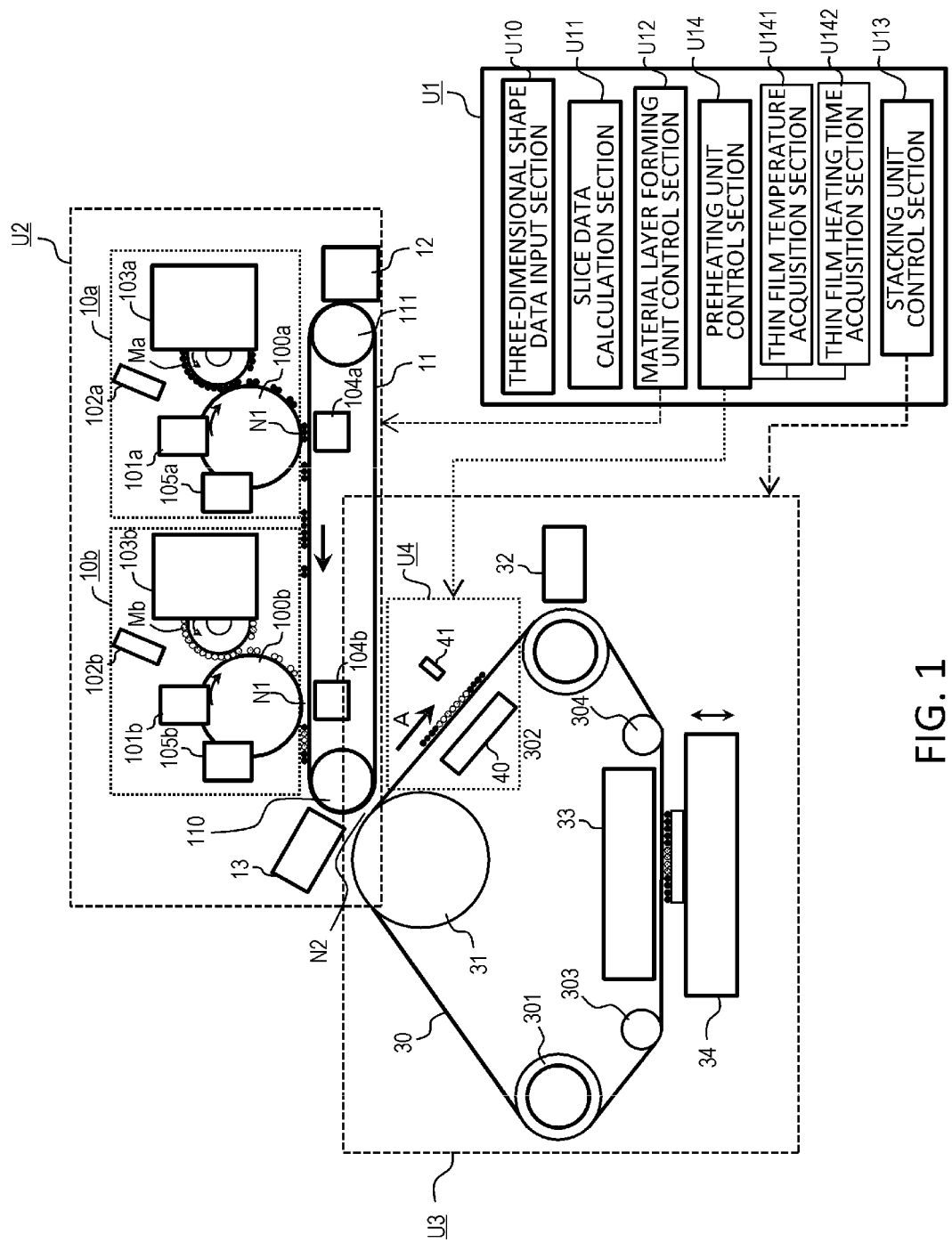
FIG. 1 is a diagram schematically showing the entire configuration of a shaping apparatus according to a first embodiment.

A mode for implementing the present invention will now be exemplarily described with reference to the drawings. It is to be understood that procedures, control parameters, target values, and the like of various types of control including dimensions, materials, shapes, relative arrangements, and the like of respective members described in the following embodiment are not intended to limit the scope of the present invention to the embodiment described below unless specifically stated otherwise.

The present invention relates to a shaping apparatus employing an AM technology, that is, a technology for manufacturing a three-dimensional object (solid object) by stacking thin layers on which shaping materials are two-dimensionally arranged or thin films obtained by melting the shaping materials.

As the shaping material, it is possible to select various materials in accordance with the use, function, and purpose of a solid object to be fabricated. In the present specification, a material constituting a three-dimensional object as a shaping target is referred to as "a build material", and a portion formed of the build material is referred to as a build body. A material constituting a support body for supporting the build body in the process of fabrication (e.g., build supporting an overhang portion from below) is referred to as "a support material". In addition, in the case where it is not necessary to distinguish between them, a term "shaping material" is simply used. As the build material, it is possible to use thermoplastic resins such as, e.g., polyethylene (PE), polypropylene (PP), ABS, and polystyrene (PS). Further, as the support material, in order to facilitate removal from the build body, it is possible to use a material having thermoplasticity and water solubility preferably. Examples of the support material include carbohydrate, polylactic acid (PLA), polyvinyl alcohol (PVA), and polyethylene glycol (PEG).

In addition, in the present specification, digital data obtained by slicing three-dimensional shape data relating to a solid model as a fabrication target in a plurality of layers in a stacking direction is referred to as "slice data". The slice data is obtained by adding information such as data on a support material according to need. A layer (image for one layer) formed of a shaping material based on the slice data is referred to as a "material layer". However, the image for one layer is constituted by images formed by a plurality of image forming sections, and the images formed by the respective image forming sections are referred to as "material images". Moreover, the solid model (i.e., three-dimensional object represented by the three-dimensional shape data given to a shaping apparatus) to be fabricated by the shaping apparatus is referred to as a "shaping target object", and a three-dimensional object (solid object) fabricated by (output from) the shaping apparatus is referred to as a "shaping object". In the case where the shaping object includes a support body, a portion obtained by removing the support body from the shaping object becomes a "build body" constituting the shaping target.

First Embodiment (Entire Configuration of Shaping Apparatus)

The entire configuration of a shaping apparatus according to a first embodiment of the present invention will be described with reference to FIG. 1. FIG. 1 is a diagram schematically showing the entire configuration of the shaping apparatus according to the present embodiment.

As shown in FIG. 1, a shaping apparatus 1 is schematically configured to have a control unit U1, a material layer forming unit U2, a preheating unit U4, and a stacking unit U3. The control unit U1 is a unit responsible for processing for generating a plurality of layers of slice data from three-dimensional shape data relating to a shaping object, controlling of the respective sections of the shaping apparatus 1, and the like. The material layer forming unit U2 is a unit that forms a material layer formed of a shaping material based on an electrophotographic process. The preheating unit U4 is a unit that heats and softens a material layer formed by the material layer forming unit U2 and conveyed by a conveyance body so as to be formed into a thin film. Further, the stacking unit U3 is a unit that successively stacks and fixes a plurality of material layers heated by the preheating unit U4 to form a shaping object.

The units U1 to U3 may be accommodated in housings different from each other or a single housing. The configuration in which the units U1 to U3 are accommodated in different housings offers advantages that it is possible to facilitate the combination, replacement, and the like of the units according to the application, demanded performance, desired shaping material, installation space, failure, and the like of the shaping apparatus and improve the freedom degree and convenience of an apparatus configuration. On the other hand, the configuration in which all the units are accommodated in a single housing offers advantages that it is possible to realize the miniaturization of the entire apparatus, cost reduction, and the like. In addition, by configuring the preheating unit U4 as a single unit so as to allow its combination, replacement, and the like inside the stacking unit U3, it is possible to further improve the convenience. Note that a unit configuration shown in FIG. 1 is only an example, and it is also possible to suitably apply the present invention to a shaping apparatus employing other configurations.

(Control Unit)

Hereinafter, the configuration of the control unit U1 will be described.

As shown in FIG. 1, the control unit U1 has, as its functions, a three-dimensional shape data input section U10, a slice data calculation section U11, a material layer forming unit control section U12, a preheating unit control section U14, a stacking unit control section U13, and the like. In addition, the preheating unit control section U14 has a thin film temperature acquisition section U141 and a thin film heating time acquisition section (time measurement section) U142.

The three-dimensional shape data input section U10 has the function of receiving three-dimensional shape data relating to a shaping target object from an external apparatus (e.g., a personal computer and the like). As the three-dimensional shape data, it is possible to use data created and output by a three-dimensional CAD, a three-dimensional modeler, a three-dimensional scanner, and the like. The file format of the three-dimensional shape data is not particularly limited, but a stereo lithography (STL) file format may be preferably used.

The slice data calculation section U11 has the function of slicing a shaping target object represented by three-dimensional shape data at a prescribed pitch to calculate the cross-sectional shapes of respective layers and generating data (slice data) used to form a material layer based on the cross-sectional shapes. In addition, the slice data calculation section U11 analyzes three-dimensional shape data or slice data relating to upper and lower layers to determine the presence or absence of an overhang portion (portion floating in the air) and causes the slice data to contain data used to form a support body according to need.

As will be described in detail later, the material layer forming unit U2 of the present embodiment is allowed to form a material layer using a plurality of types of shaping materials. Therefore, as the slice data, data for forming material images formed of the respective shaping materials is generated. At this time, in order to prevent the material images formed of the different shaping materials from overlapping each other, it is preferable to adjust the positions and shapes of the images in the respective slice data. When the images overlap each other, the thickness of the material layer is fluctuated, which results in a concern about reducing the dimensional accuracy of a shaping object. As the file format of the slice data, it is possible to use, for example, multi-value image data (where respective values represent the types of the shaping materials) or multi-plane image data (where respective planes correspond to the types of the shaping materials).

The material layer forming unit control section U12 has the function of controlling an image forming process in the material layer forming unit U2 based on slice data generated by the slice data calculation section U11. In addition, the preheating unit control section U14 has the function of controlling a thin film forming process in the preheating unit U4, and the stacking unit control section U13 has the function of controlling a stacking process in the stacking unit U3. The specific control contents of the respective units will be described later.

Although not shown in the figure, the control unit U1 also has an operating section, a display section, and a storage section. The operating section has the function of receiving an instruction from a user. For example, it is possible to input the on/off of a power supply, various types of settings of the apparatus, an operating instruction, and the like with the operating section. The display section has the function of presenting information to a user. For example, it is possible to present various types of setting screens, an error message, an operating status, and the like with the display section. The storage section has the function of storing three-dimensional shape data, slice data, various types of setting values, and the like.

In terms of hardware, it is possible to constitute the control unit U1 by a computer having a central processing unit (CPU), a memory, an auxiliary storage device (such as a hard disk and a flash memory), an input device, a display device, and various types of I/F. The above respective function sections U10 to U14 are implemented when a program stored in the auxiliary storage device and the like is read and executed by the CPU to control necessary devices. It is to be understood that some or all of the above function sections may be constituted by a circuit such as an application specific integrated circuit (ASIC) and a field-programmable gate array (FPGA) or may be executed by other computers using a technology such as cloud computing and grid computing.

(Material Layer Forming Unit)

Next, the configuration of the material layer forming unit U2 will be described.

The material layer forming unit U2 is a unit that forms a material layer formed of a shaping material based on an electrophotographic process. The electrophotographic process is a method by which to form a desired image on an image carrier (photoconductor) in the following manner. First, the image carrier is uniformly charged and then exposed according to image information, whereby a latent image (electrostatic latent image) corresponding to the image information is formed on the image carrier. Next, developer particles are attached to a latent image portion on the image carrier to form a developer image on the image carrier. By such a series of processes, a desired image is formed on the image carrier.

The principle of the electrophotographic process in the shaping apparatus is common to that used in a two-dimensional printer such as a copier. In the shaping apparatus, however, the characteristics of a material used as a developer are different from those of a toner material. Therefore, there is a likelihood that process control or a member structure in the two-dimensional printer may not be used as it is.

As shown in FIG. 1, the material layer forming unit U2 has a first image forming section 10a, a second image forming section 10b, a first conveyance belt (first conveyance body) 11, a belt cleaning device 12, and an image detection sensor 13.

The image forming section 10a is a section that forms a material image using a shaping material Ma. The image forming section 10a has an image carrier 100a, a charging device 101a that charges the image carrier 100a, an exposure device 102a that exposes the image carrier 100a to form a latent image, and a development device 103a that develops a latent image with the shaping material Ma to form a material image on the front surface of the image carrier 100a. In addition, the image forming section 10a has a transfer device 104a that transfers a material image onto the first conveyance belt 11 and a cleaning device 105a that cleans the image carrier 100a.

The image forming section 10b is a section that forms a material image using a shaping material Mb. Like the image forming section 10a, the image forming section 10b has an image carrier 100b, a charging device 101b, an exposure device 102b, a development device 103b, a transfer device 104b, and a cleaning device 105b.

In the present embodiment, a build material formed of a thermoplastic resin and the like is used as the shaping material Ma, and a support material having thermoplasticity and water solubility is used as the shaping material Mb. Note that the image forming section 10b does not perform image formation in the case where a cross section does not have an overhang portion and does not need a support body. In this case, a material layer is formed only of the material image of the build material. The respective shaping materials preferably have a particle diameter of 5 μm or more and 50 μm or less. In the present embodiment, the respective shaping materials have a particle diameter of about 20 μm.

Figure 2:
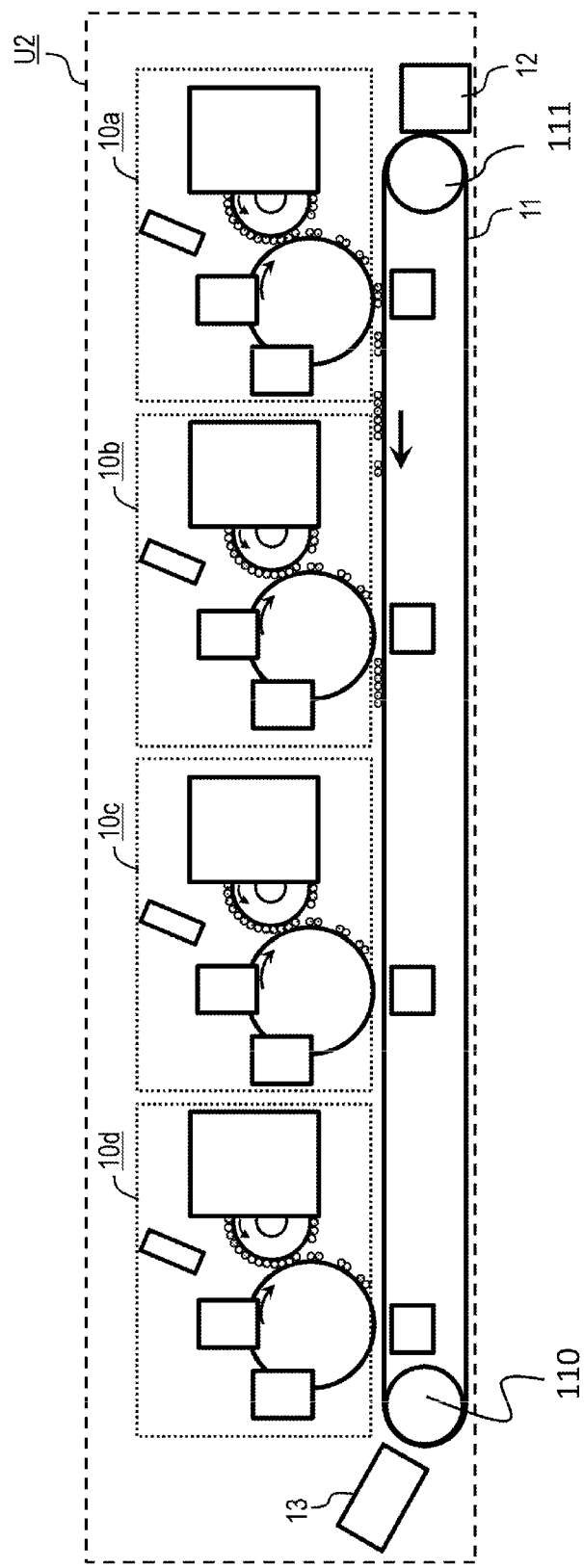
FIG. 2 is a schematic diagram showing an example of arranging four image forming sections.

The image forming sections 10a and 10b are arranged side by side along the front surface of the first conveyance belt 11. Note that the image forming section 10a using the build material is arranged upstream of the image forming section 10b using the support material in the rotating direction of the first conveyance belt 11 (in the moving direction of the front surface of the belt) in FIG. 1, but the image forming sections may be arranged in any order. In addition, the number of the image forming sections may be two or more and increased according to the types of used shaping materials. FIG. 2 shows an example of a case in which four image forming sections 10a to 10d are arranged. In the case, it is possible to employ a configuration in which material images are formed using four types of build materials, a configuration in which material images are formed using three types of build materials and a support material, and the like. Moreover, a configuration in which two image forming sections have the same shaping material may be employed. By the combination of a plurality of types of materials different in material, color, hardness, properties, and the like, a variety of shaping objects are generated.

This excellence in extensibility can be said to be one of the advantages of the shaping apparatus based on the electrophotographic process.

Hereinafter, the configurations of the respective sections of the material layer forming unit U2 will be described in detail. It is to be understood that suffixes a to d added to the symbols of respective constituents will be omitted in descriptions that are common to the image forming sections 10a to 10d, i.e. the constituents will be indicated as "image forming section 10", "image carrier 100", etc.

FIG. 3A is a diagram showing the configuration of the image forming section 10, and FIG. 3B is a diagram showing the detailed configuration of a development device 103.

(Image Carrier)

The image carrier 100 is a member that carries a latent image. In the present embodiment, a photosensitive drum is used in which the layer of a photoconductor having photoconductivity is formed on the outer peripheral surface of a metal cylinder formed of aluminum and the like. As the photoconductor, it is possible to use an organic photoconductor (OPC), an amorphous silicon photoconductor, a selenium photoconductor, and the like. The type of the photoconductor may be appropriately selected according to the application or demanded performance of the shaping apparatus. The image carrier 100 is rotatably supported by a frame body (not shown), and caused to rotate clockwise at a constant speed in FIG. 3A by a driving source (not shown) when a material image is formed.

(Charging Device)

A charging device 101 is a section that uniformly charges the front surface of the image carrier 100. In the present embodiment, a non-contact charging method based on a corona discharge is used, but other charging methods such as a roller charging method by which to bring a charging roller in contact with the front surface of the image carrier 100 may be used.

(Exposure Device)

An exposure device 102 is a section that exposes the image carrier 100 according to image information (slice data) to form a latent image on the front surface of the image carrier 100. The exposure device 102 is configured to have, for example, a light source such as a semiconductor laser and a light-emitting diode, a scanning section having a polygon mirror rotating at a high speed and the like, and an optical member such as an image forming lens.

(Development Device)

A development device 103 is a section that supplies a developer (here, particles of a build material or a support material) M to the image carrier 100 to visualize a latent image. Note that an image visualized by the developer on the image carrier 100 is referred to as a material image in the present specification.

As shown in FIG. 3B, the development device 103 has a container 1030 that accommodates the developer, a supply roller 1031 provided inside the container 1030, a development roller 1032 that carries the developer M and supplies the same to the image carrier 100, and a restriction member 1033 that restricts the thickness of the developer M. The supply roller 1031 and the development roller 1032 are rotatably supported by the container 1030 and caused to rotate counterclockwise at a constant speed in FIG. 3B by a driving source (not shown) when a material image is formed. After the developer particles stirred and charged by the supply roller 1031 are supplied to the development roller 1032 and restricted so as to have a thickness of substantially one particle by the restriction member 1033, a latent image is developed at a portion at which the development roller 1032 and the image carrier 100 face each other. As a development method, either of a reverse development method by which to attach the developer to a portion where charges are removed by exposure on the front surface of the image carrier 100 and a normal development method by which to attach the developer to a portion not exposed on the front surface of the image carrier 100 may be used.

The development device 103 may be structured to have so-called a development cartridge and detachably/attachably provided with respect to the material layer forming unit U2. Thus, it is possible to easily replenish and change the developer (the build material or the support material) by the replacement of the cartridge. Alternatively, the image carrier 100, the development device 103, a cleaning device 105, and the like may be formed into an integrated cartridge (i.e., process cartridge) to allow the replacement of the image carrier itself. In the case where there is a particular problem with the abrasion or service life of the image carrier 100 due to the type, hardness, and particle diameters of the build material or the support material, the configuration of the process cartridge is more excellent in practicability and usability.

(Transfer Device)

A transfer device 104 is a section that transfers a material image formed on the peripheral surface of the image carrier 100 onto the front surface of the first conveyance belt 11. The transfer device 104 is arranged on a side opposite to the image carrier 100 across the first conveyance belt 11 and caused to electrostatically transfer a material image onto the first conveyance belt 11 as a voltage having a polarity opposite to the charged polarity of the material image on the image carrier 100 is applied to the transfer device 104. The transfer of a material image from the image carrier 100 onto the first conveyance belt 11 is also referred to as primary transfer. Note that a transfer method based on a corona discharge is used in the present embodiment, but any transfer method other than a roller transfer method and an electrostatic transfer method may be used.

(Cleaning Device)

The cleaning device 105 is a section that collects developer particles and the like remaining on the image carrier 100 without being transferred to clean the front surface of the image carrier 100. The cleaning device 105 used in the present embodiment is of a blade type that scrapes off the developer particles with a cleaning blade contacting the image carrier 100 in a countering direction, but a cleaning device of a brush type or an electrostatic adsorption type may be used.

(First Conveyance Belt)

The first conveyance belt 11 is a carrier (conveyance body) onto which material images formed by the respective image forming sections 10 are to be transferred. After a material image formed of a build material is transferred from the image forming section 10a onto the first conveyance belt 11, a material image formed of a support material is transferred from the image forming section 10b downstream of the image forming section 10a is transferred so as to be aligned with the material image on the first conveyance belt 11. Thus, a material layer for one sheet (for one layer) is formed on the front surface of the first conveyance belt 11.

The first conveyance belt 11 is an endless belt formed of a material such as a resin and polyimide, and laid across in its tensioned state between a plurality of rollers 110 and 111 as shown in FIG. 1. Note that a tension roller other than the rollers 110 and 111 may be provided to allow the adjustment the tension of the first conveyance belt 11. At least one of the rollers 110 and 111 is a driving roller, and caused to rotate the first conveyance belt 11 counterclockwise in FIG. 1 by the driving force of a driving source (not shown) when a material image is formed. In addition, the roller 110 is a roller that forms a secondary transfer part N2 with a secondary transfer roller 31 of the stacking unit U3. Note that the endless belt is used as the first conveyance belt 11 in FIG. 1, but a mode other than a belt may be employed so long as it is capable of receiving material images from the respective image forming sections 10 and conveying the same to the secondary transfer part N2.

(Belt Cleaning Device)

A belt cleaning device 12 is a section that cleans a shaping material and the like attached to the front surface of the first conveyance belt 11. The cleaning device used in the present embodiment is of a blade type that scrapes off a material with a cleaning blade contacting the first conveyance belt 11 in a countering direction, but a cleaning device of a brush type or an electrostatic adsorption type may be used.

(Image Detection Sensor)

The image detection sensor 13 is a section that reads material layers carried on the front surface of the first conveyance belt 11. The detection result from the image detection sensor 13 is used for the alignment of the material layers, timing control with the stacking unit U3, detection of the abnormality of the material layers, and the like. Note that the abnormality of the material layers represents an undesired image formed by the material layers, nonexistence of an image, large fluctuation in thickness, large positional deviation of an image, and the like.

(Preheating Unit)

Next, the configuration of the preheating unit U4 will be described. FIGS. 4A and 4B are schematic perspective diagrams for describing the configuration of the preheating unit U4.

The preheating unit U4 is a unit that heats and softens a material layer so as to be formed into a sheet-shaped thin film before the material layer carried and conveyed by a second conveyance belt 30 serving as a conveyance body reaches a prescribed stacking position that will be described later. The material layer is heated with its front surface side exposed to the air, the front surface side not being carried by the second conveyance belt 30.

As shown in FIGS. 1, 4A, and 4B, the preheating unit U4 has a heating member (preheating section) 40 and a temperature measurement section 41.

(Heating Member)

The heating member 40 is a member that heats a material layer carried by the second conveyance belt 30 to soften a shaping material constituting the material layer.

FIG. 4A shows a mode in which a plate-shaped member formed of metal and the like is used as the heating member 40 and a material layer Mab is heated on the rear surface side (where the material layer is not carried) of the second conveyance belt 30 by a sheathed heater and the like. FIG. 4B shows a mode in which the material layer Mab is heated on a material layer side in a non-contact manner by a halogen heater and the like serving as the heating member 40 of another mode. The heating member is not limited to the modes shown in FIGS. 4A and 4B, but known heating devices may be used. Note that as for the material layer carried by the second conveyance belt 30, the material layer before heating and the material layer formed into a thin film (sheet) by heating are denoted as Mab and Ms, respectively, in FIGS. 4A and 4B.

(Temperature Measurement Section)

The temperature measurement section 41 is a temperature sensor that measures the front surface temperature of a material layer conveyed by the second conveyance belt 30. Specifically, it is possible to use a known sensor such as a contact-type temperature sensor using a thermocouple and the like and a radiation temperature sensor that measures a temperature in a non-contact manner. However, there is a concern about breaking the shape of the material layer in the case where the contact-type temperature sensor is used. Therefore, it is preferable to use the non-contact type temperature sensor.

(Stacking Unit)

Next, the configuration of the stacking unit U3 will be described.

The stacking unit U3 is a unit that receives material layers formed by the material layer forming unit U2 from the first conveyance belt 11 and successively stacks and fixes the material layers formed into thin films by the preheating unit U4 to form a shaping object.

As shown in FIG. 1, the stacking unit U3 has the second conveyance belt 30, a secondary transfer roller 31, an image detection sensor 32, a heater 33, and a stage 34. Hereinafter, the configurations of the respective sections of the stacking unit U3 will be described in detail.

(Second Conveyance Belt)

The second conveyance belt 30 is a conveyance body that receives material layers formed by the material layer forming unit U2 from the first conveyance belt 11 and carries and conveys the material layers to a stacking position. The stacking position is a position at which the material layers are stacked (accumulated on a shaping object that is being fabricated), and corresponds to the portion of the second conveyance belt 30 held between the heater 33 and the stage 34 in the configuration of FIG. 1.

The second conveyance belt 30 is an endless belt formed of a material having heat resistance such as metal and a polyimide resin, and laid across in its tensioned state between the secondary transfer roller 31 and a plurality of rollers 301, 302, 303, and 304 as shown in FIG. 1. At least any of the secondary transfer roller 31 and the rollers 301 and 302 is a driving roller, and the second conveyance belt 30 rotates clockwise in FIG. 1 as the driving roller is caused to rotate by the driving force of a driving source (not shown). In addition, the rollers 303 and 304 are a pair of rollers responsible for adjusting the tension of the second conveyance belt 30 and flattening the portion of the second conveyance belt 30 (i.e., the material layers at their stacking)

passing through the stacking position. It is to be understood that like the first conveyance belt 11, the second conveyance belt 30 may employ a mode other than a belt so long as it is capable of receiving the material layers from the first conveyance belt 11 and conveying the same to the stacking position.

(Secondary Transfer Roller)

The secondary transfer roller 31 is a section that transfers material layers from the first conveyance belt 11 of the material layer forming unit U2 onto the second conveyance belt 30 of the stacking unit U3. The secondary transfer roller 31 sandwiches the first conveyance belt 11 and the second conveyance belt 30 with the roller 110 of the material layer forming unit U2 to form the secondary transfer part N2 between the first conveyance belt 11 and the second conveyance belt 30. Further, the material layers are transferred onto the second conveyance belt 30 as a voltage having a polarity opposite to the charged polarity of the material layers is applied to the secondary transfer roller 31 by a power supply (not shown).

(Image Detection Sensor)

The image detection sensor 32 is a section that reads material layers carried by the front surface of the second conveyance belt 30. The detection result from the image detection sensor 32 is used for the alignment of the material layers, conveyance timing control for the stacking position, and the like.

(Heater)

The heater 33 is a section that controls the temperature of material layers conveyed to the stacking position. As the heater 33, it is possible to use, for example, a ceramic heater, a halogen heater, and the like. Here, the temperature control section may further have a configuration that positively reduces the temperature of the material layers by radiation or cooling, besides a heater for heating.

Note that the lower surface (surface on a side facing the second conveyance belt 30) of the heater 33 is flat and also serves as a guide for the second conveyance belt 30 when the belt 30 passes through the stacking position, as well as a pressing member that applies uniform pressure to the material layers.

(Stage)

The stage 34 is a flat table on which a shaping object is to be stacked. The stage 34 is configured to be movable in a vertical direction (direction perpendicular to the belt surface (stage front surface (upper surface) of the second conveyance belt 30 at the stacking position)) by an actuator (not shown).

The stage 34 sandwiches a material layer on the second conveyance belt 30 carried and conveyed to the stacking position with the heater 33 and performs heating and pressurization (radiation or cooling according to need) to transfer the material layers from the side of the second conveyance belt 30 onto the side of the stage 34. A material layer for the first layer is directly transferred onto the stage 34, and material layers for the second and subsequent layers are stacked on a shaping object that is being fabricated on the stage. Thus, in the present embodiment, a stacking section that stacks the material layers is constituted by the heater 33 and the stage 34.

(Operation of Shaping Apparatus)

Next, the operation of a shaping apparatus 1 of the present embodiment having the above configurations will be described.

Here, with an assumption that the generation processing of slice data has been completed by the control unit U1, processes to form material layers for respective layers and stack the material layers will be successively described with appropriate reference to the drawings.

Figure 5:
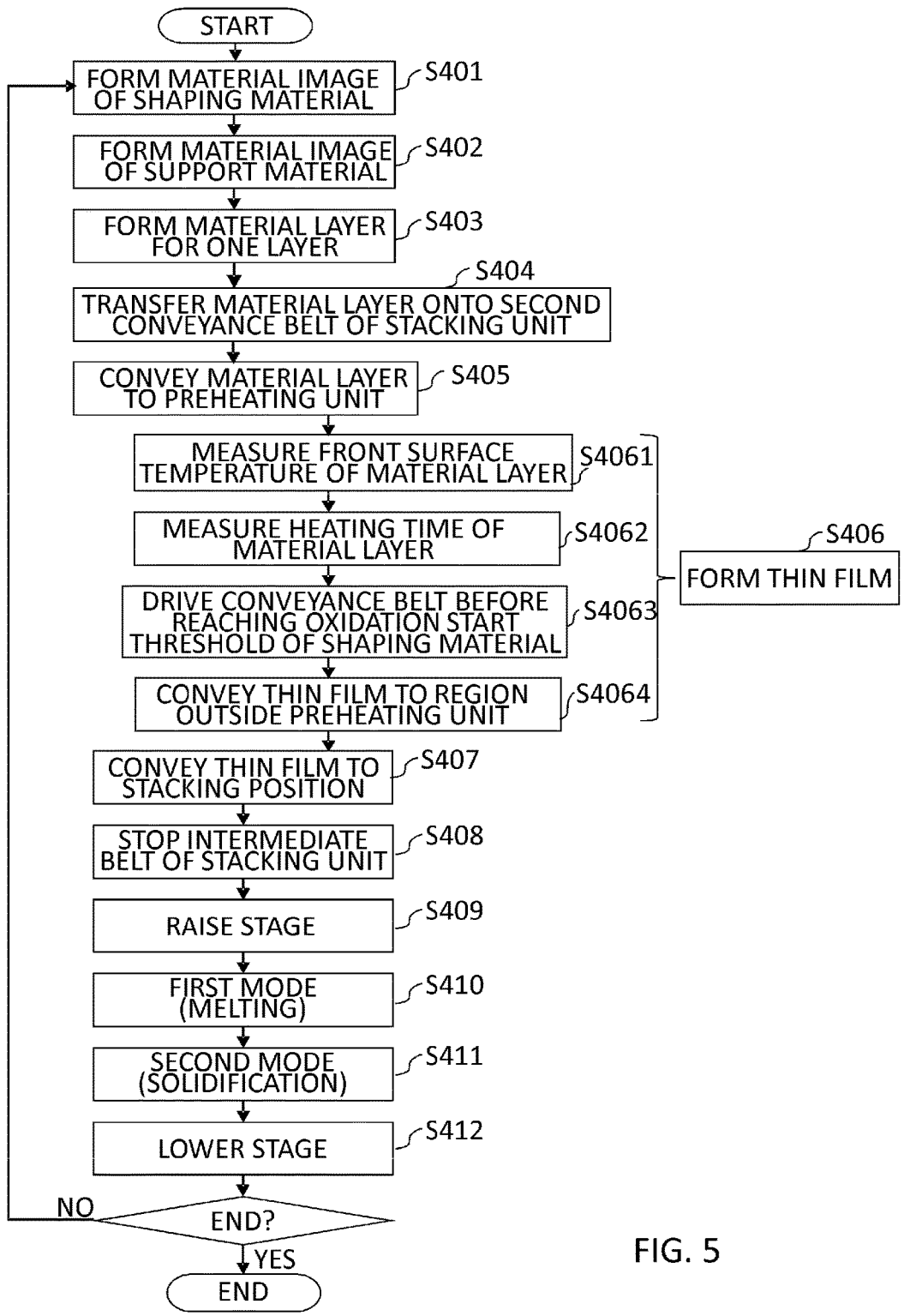
FIG. 5 is a flowchart showing the operation sequence of the shaping apparatus of the first embodiment.

FIG. 5 is a flowchart showing the operation sequence of the shaping apparatus 1 of the present embodiment.

(Material Layer Forming Process)

Hereinafter, a material layer forming process will be described.

First, the control unit U1 controls a driving source such as a motor such that the image carriers 100 of the respective image forming sections 10, the first conveyance belt 11, and the second conveyance belt 30 rotate so as to synchronize with each other at the same peripheral speed (process speed).

After the respective rotation speeds of the image carriers 100, the first conveyance belt 11, and the second conveyance belt 30 are stabilized, the control unit U1 starts the forming operation of a material image with the most-upstream-side image forming section 10a among the image forming sections (S401). That is, the control unit U1 controls the charging device 101a to uniformly charge the entire front surface of the image carrier 100a with a prescribed polarity and a prescribed charging potential. Subsequently, the control unit U1 exposes the charged front surface of the image carrier 100a with the exposure device 102a according to information corresponding to an image to be formed. Here, charges are removed by the exposure to form a potential difference between an exposure part and a non-exposure part. An image resulting from the potential difference is a latent image. On the other hand, the control unit U1 drives the development device 103a to attach the particles of a build material to the latent image on the image carrier 100a to form a material image formed of the build material. The material image is primarily transferred onto the first conveyance belt 11 by the transfer device 104a.

In addition, with a prescribed time difference after starting the forming operation of the material image with the image forming section 10a, the control unit U1 starts the forming operation of a material image with the downstream-side image forming section 10b (S402). The image forming section 10b performs the forming operation of the material image according to the same procedure as that of the image forming section 10a. Here, the time difference to start the forming operation of the material image is set at a value obtained by dividing a distance from a primary transfer part N1 at the upstream-side image forming section 10a to a primary transfer part N1 at the downstream-side image forming section 10b by a process speed. Thus, the two material images formed by the respective image forming sections 10a and 10b are arranged on the first conveyance belt 11 in alignment with each other, whereby a material layer for one layer formed of the build material and a support material is formed (primary transfer) (S403). Note that the image forming section 10b does not perform the forming operation of the material image in the case where a cross section does not have an overhang portion and does not need a support portion. In this case, the material layer is formed only of the material image of the build material.

After that, the material layer is conveyed to the stacking unit U3 by the first conveyance belt 11.

(Thin Film Forming Process)

While the forming operation of the material images is performed as described above, the second conveyance belt 30 of the stacking unit U3 synchronously rotates at the same peripheral speed (process speed) in a state of contacting the first conveyance belt 11. Then, according to a timing at which the front end of the material layer on the first conveyance belt 11 reaches the secondary transfer part N2, the control unit U1 applies a prescribed transfer bias to the secondary transfer roller 31 to transfer the material layer onto the second conveyance belt 30 (S404).

The second conveyance belt 30 continues to rotate at the process speed to convey the material layer in a direction indicated by arrow A in FIG. 1. When the material layer is conveyed to the preheating unit U4 (S405), the control unit U1 stops the driving of the second conveyance belt 30 and heats and softens the material layer with the heating member 40 to form a thin film (S406).

Here, a thin film forming process in step S406 will be described in detail with reference to FIG. 5.

Figure 8:
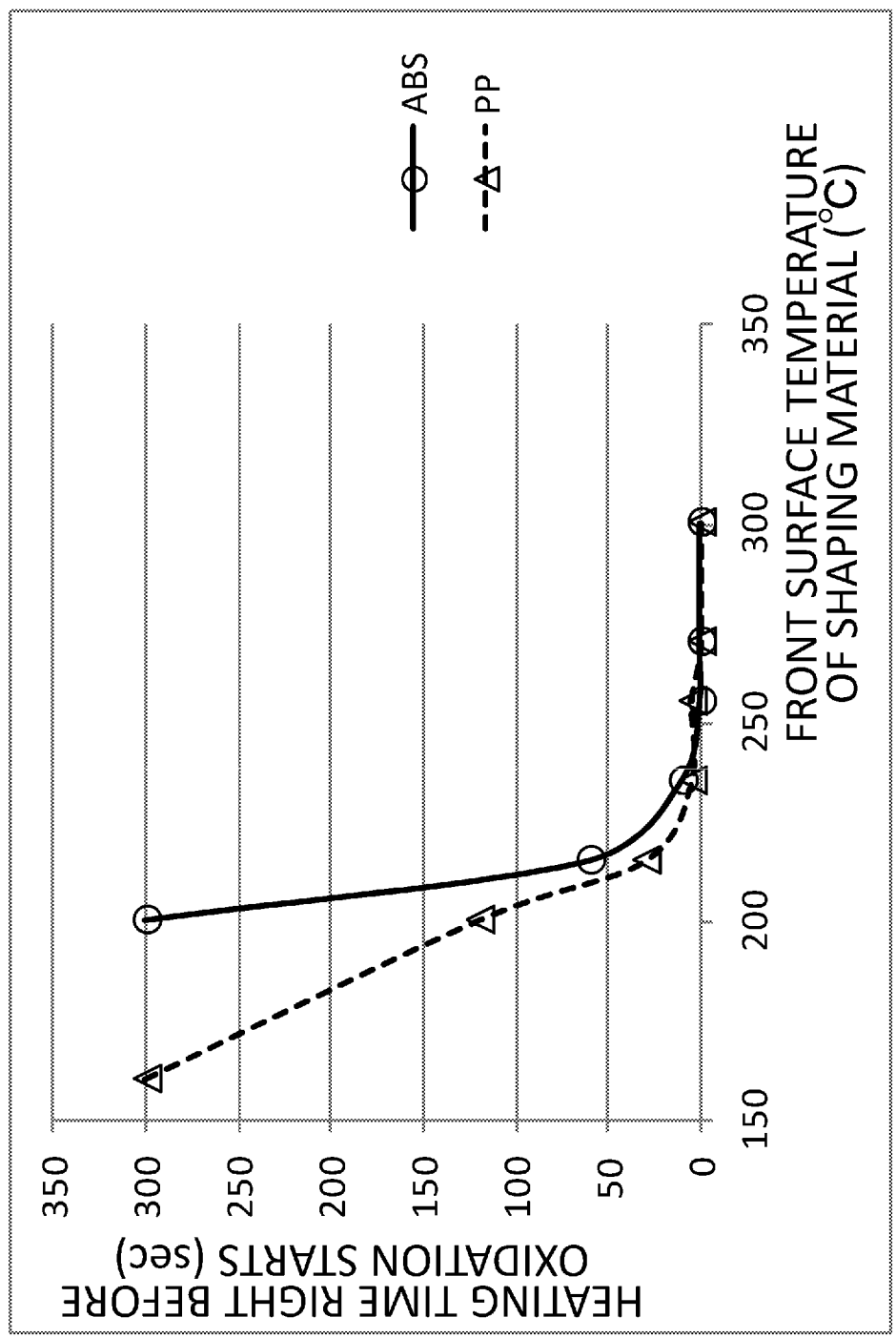
FIG. 8 is a diagram showing oxidation start thresholds relative to the front surface temperatures of the build materials.

First, when the material layer conveyed by the second conveyance belt 30 is conveyed to the preheating unit U4, the control unit U1 stops the driving of the second conveyance belt 30. In this state, the temperature measurement section 41 measures the front surface temperature of the material layer (S4061). The control unit U1 acquires the temperature of the air-exposed front surface of the material layer measured by the temperature measurement section 41, and starts the measurement of a heating time after the temperature has reached a desired temperature to acquire a heating time (S4062). At this time, the control unit U1 estimates a timing at which a shaping material starts oxidization from the acquisition result of the front surface temperature of the material layer, the measurement result of the heating time, and an oxidation start threshold for the shaping material referred from a relationship table showing the relationship between the temperature and the heating time of the shaping material that will be described later with reference to FIG. 8. The relationship table showing the relationship between the temperature and the heating time of the shaping material in FIG. 8 is stored in the storage section of the control unit U1.

Figure 6A:
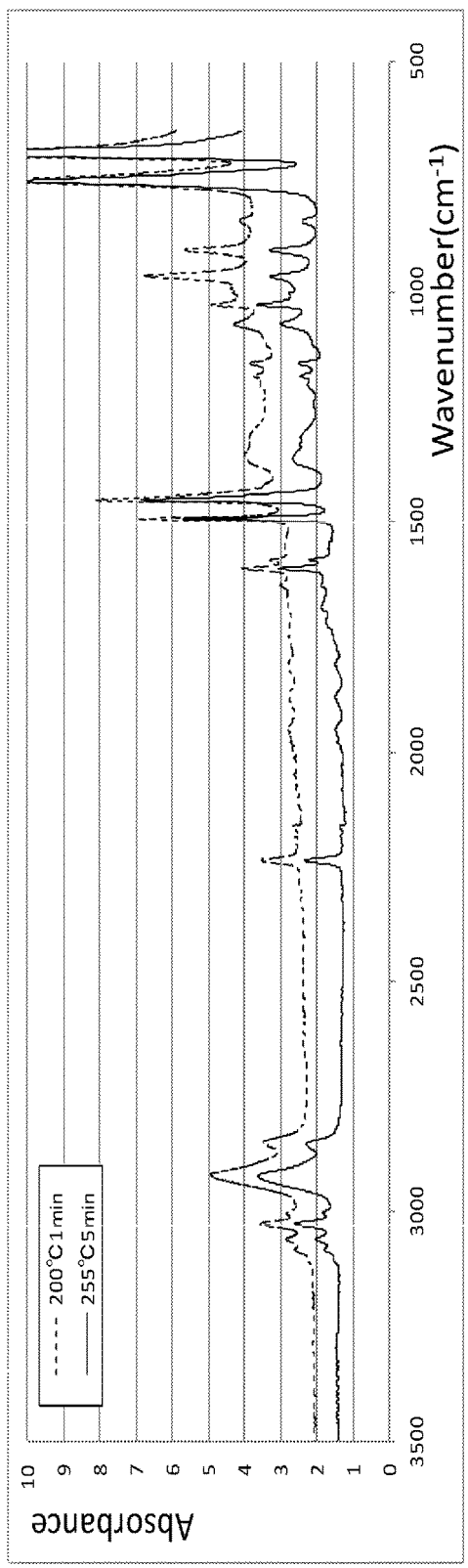
FIGS. 6A and 6B are diagrams showing changes in absorption spectrums with the oxidation of shaping materials.
Figure 6B:
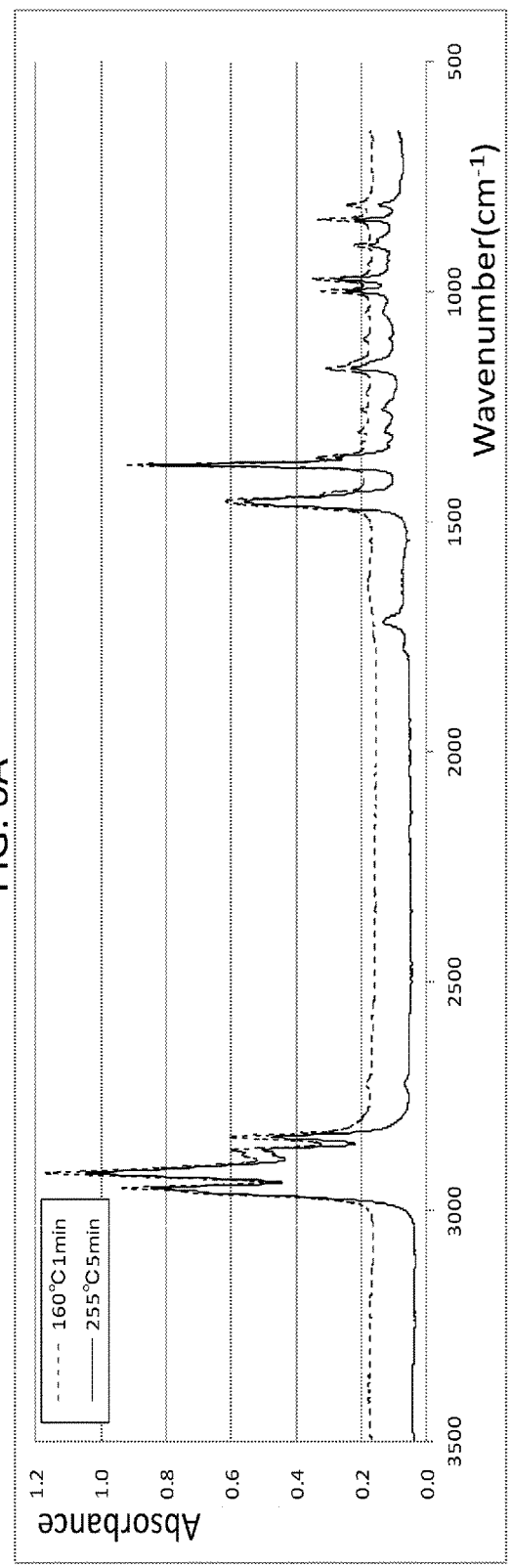

Here, the oxidation start threshold for the shaping material will be described. FIG. 6A is a diagram in which an absorption spectrum (represented by dashed lines) in the case where ABS as an example of the build material is not oxidized (heated at 200° C. for one minute) is compared with an absorption spectrum (represented by a solid line) in the case where the ABS is oxidized (heated at 255° C. for five minutes). Similarly, FIG. 6B is a diagram in which an absorption spectrum (represented by dashed lines) in the case where polypropylene (PP) is not oxidized (heated at 160° C. for one minute) is compared with an absorption spectrum (represented by a solid line) in the case where the PP is oxidized (heated at 255° C. for five minutes).

The absorption spectrums were obtained by measuring the front surface of the heated ABS or PP with Spectrum One (manufactured by PerkinElmer, Inc.; FT-IR Spectrometer). As is clear from FIGS. 6A and 6B, an absorption peak appears near 1700 cm$^{-1}$ when the ABS or PP is oxidized. This is because the double bond (C=O) between carbon and oxygen is newly generated as the ABS or PP is oxidized.

Figure 7A:
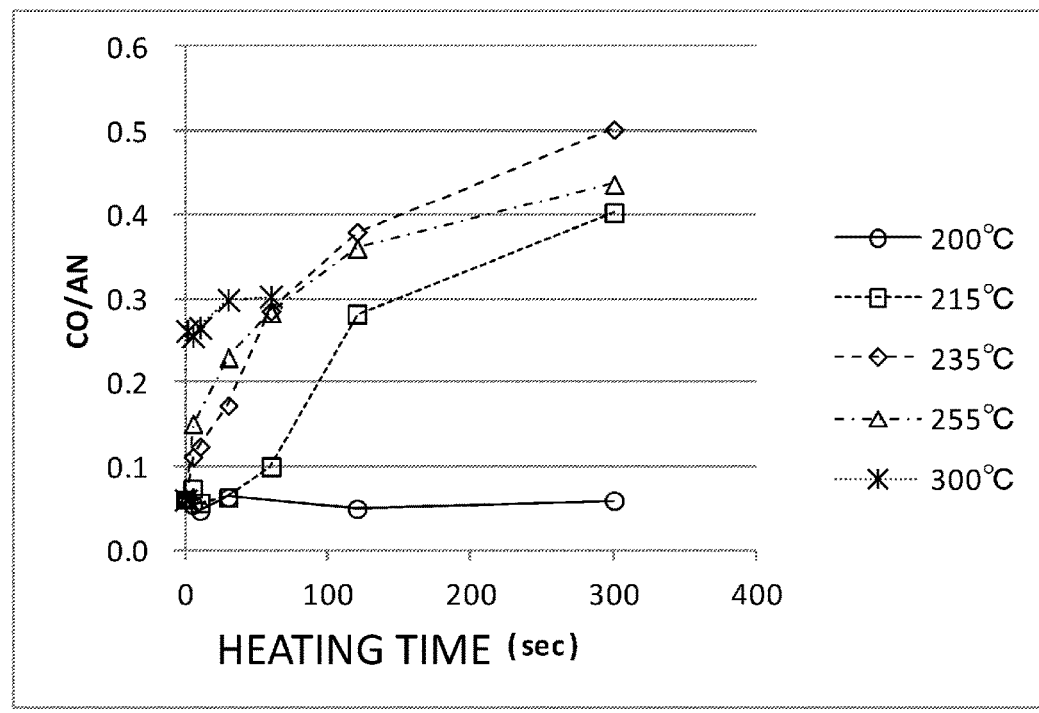
FIGS. 7A and 7B are diagrams showing the transitions of heating times and oxidation degrees depending on the front surface temperatures of the build materials.
Figure 7B:
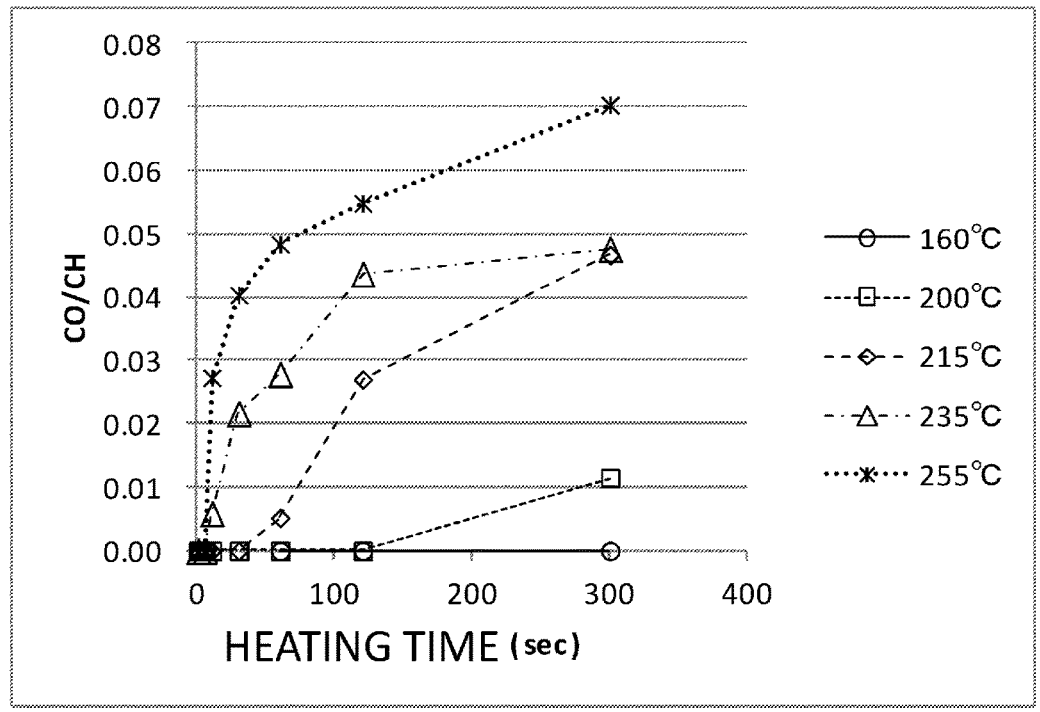

FIG. 7A is a diagram showing an oxidation degree in the case where the front surface temperature (heating temperature) and the heating time of the ABS are changed. FIG. 7B is a diagram showing an oxidation degree in the case where the front surface temperature (heating temperature) and the heating time of the PP are changed. As described above, the relationship among the front surface temperature, the heating time, and the oxidation degree is peculiar to the respective shaping materials.

For the ABS, in FIG. 6A, the ratio of the peak value (near 1700 cm$^{-1}$) of the absorption spectrum at C=O to the peak value (near 2230 cm$^{-1}$) of the absorption spectrum of the triple bond between acrylonitrile having high heat resistance and hardly decomposed, carbon, and oxygen was calculated and evaluated as an oxidation degree. For the PP, in FIG. 6B, the ratio of the peak value (near 1700 cm$^{-1}$) of the absorption spectrum at C=O and the peak value (near 3000 cm$^{-1}$) of the absorption spectrum of the bond (C—H) between carbon and hydrogen constituting the PP was calculated and evaluated as an oxidation degree. In the following description, a state in which the oxidation degree exceeds a setting value (value that may be arbitrarily set by a user) is expressed as a "state in which the oxidation of the shaping material starts".

As is clear from FIGS. 7A and 7B, it is found that the oxidation starts (proceeds) in a shorter heating time when the ABS or PP has a higher front surface temperature. On the other hand, when the ABS or PP is heated at, for example, 215° C., it is found that the oxidation does not start (proceed) until a certain heating time but suddenly proceeds afterwards.

FIG. 8 is a graphic representation of the relationship table (hereinafter referred to as oxidation characteristics) showing the relationship between the front surface temperature and the heating time right before the oxidation starts in the case where the front surface temperatures of the ABS (represented by a solid line) and the PP (represented by dashed lines) are changed, and the relationship table is stored in the storage section of the control unit U1. That is, FIG. 8 is a diagram showing the oxidation characteristics of the ABS (represented by the solid line) and the PP (represented by the dashed lines). In FIG. 8, curved lines show that the oxidation does not proceed on a lower temperature side and a shorter time side but proceeds on a higher temperature side and a longer time side. Here, in the present specification, a coordinate point showing a heating time relative to a certain front surface temperature of the shaping material on the relationship table in FIG. 8 is referred to as a relationship value for the sake of convenience.

The thin film forming process in step S406 will be continuously described.

The control unit U1 refers to the oxidation characteristics of the shaping material shown in FIG. 8 and estimates a timing at which the oxidation of the shaping starts to drive the second conveyance belt 30 before the relationship value of the shaping material reaches the oxidation start threshold (S4063). Here, the oxidation start threshold indicates coordinates expressed by the front surface temperature and the heating time when the oxidation of the shaping material starts. Then, the control unit U1 conveys the material layer to a region outside the preheating unit U4 (S4064). As an example, a case where a material layer formed of the ABS and the PP is heated at 200° C. by the preheating unit U4 will be described. In this case, the oxidation start threshold of the PP is on a shorter time side than that of the ABS as shown in FIG. 8. Therefore, the control unit U1 conveys the material layer to the region outside the preheating unit U4 before the relationship value of the shaping material reaches the oxidation start threshold of the PP. That is, in the case where shaping is performed using the plurality of types of shaping materials, it is only necessary to control the heating according to the characteristics of the material, of which the oxidation start threshold is on the shortest time side, among the shaping materials contained in the material layer. When the material layer on the second conveyance belt 30 (on the conveyance body) is moved away from a region facing the heating member 40 and conveyed to the region outside the preheating unit U4, the influence of the heating on the material layer by the heating member 40 is lessened and the heating is stopped. Thus, the front surface temperature of the material layer on the second conveyance belt 30 reduces.

(Stacking Process)

After that, the second conveyance belt 30 continues to rotate at the same process speed to convey the material layer in the direction indicated by arrow A in FIG. 1. Then, when detecting the position of the material layer on the belt with the image detection sensor 32, the control unit U1 conveys the material layer to the prescribed stacking position based on the detection result (S407). The control unit U1 stops the second conveyance belt 30 at a timing at which the material layer reaches the stacking position to position the material layer at the stacking position (S408). Then, the control unit U1 raises the stage 34 (makes the stage 34 close to the belt surface) to make a stage front surface (in the case of the first layer) or the upper surface of a shaping object formed on the stage front surface (in the case of the second and subsequent layers) contact the material layer on the second conveyance belt 30 (S409).

In this state, the control unit U1 controls the temperature of the heater 33 according to a prescribed temperature control sequence. Specifically, the control unit U1 establishes a first temperature control mode, in which the heater 33 is heated up to a first target temperature, for a prescribed time to thermally melt the shaping material constituting the material layer (S410). Thus, the material layer is softened to bring the stage front surface or the upper surface of the shaping object on the stage closely contact the sheet-shaped material layer.

Here, since the stage front surface or the shaping object on the stage closely contacts the material layer, the amount of air in the space between the stage front surface or the shaping object and the material layer is extremely small (i.e. there is little oxygen). Therefore, the oxidation does not proceed even if the material layer is heated. After that, the control unit U1 establishes a second temperature control mode, in which the heater 33 is controlled to set a second target temperature lower than the first target temperature, for a prescribed time to solidify the softened material layer (S411).

Here, the temperature control sequence, the target temperature, the heating time, and the like are set according to the shaping material used to form the material image, i.e., the characteristics of the build material and the support material. For example, the first target temperature in the first temperature control mode is set at a value higher than the highest temperature among the melting points or the glass transition points of the respective shaping materials used to form the material image. On the other hand, the second target temperature in the second temperature control mode is set at a value lower than the lowest temperature among the crystallization temperatures of the respective shaping materials or the glass transition points of amorphous materials used to form the material image.

With such temperature control, it is possible to thermally plasticize (soften) the entire material layer, in which the plurality of types of shaping materials having different thermally melting characteristics is mixed together, in a common melting temperature region and then solidify the entire material layer in a common solidification temperature region. Accordingly, it becomes possible to stably melt and fix the material layer in which the plurality of types of shaping materials is mixed together.

Note that in the case where a temperature control region is too broad in the first temperature control mode and the second temperature control mode, the stabilization of the temperature control is time-consuming, which results in the staking process becoming excessively long. Therefore, the control region of the first target temperature may be set such that its lower limit temperature is at the highest temperature among the melting points or the glass transition points of the respective shaping materials used to form the material image, and may be set such that its upper limit temperature is at a temperature higher than the lower limit temperature by about +50° C. Similarly, the control region of the second target temperature may be set such that its upper limit temperature is at the lowest temperature among the crystallization temperatures of the respective shaping materials or the glass transition points of the amorphous materials used to form the material image, and may be set such that its lower limit temperature is at a temperature lower than the upper limit temperature by about −50° C. For example, in the case where ABS (having a glass transition point of 130° C.) is used as the build material and maltotetraose (having a glass transition point of 156° C.) is used as the support material, the control regions of the first target temperature and the second target temperature may be set as follows. That is, the control region of the first target temperature may be set such that its lower limit temperature is at 156° C. or higher and its upper limit temperature is at 206° C. or lower, and the control region of the second target temperature may be set such that its lower limit temperature is at 80° C. or higher and its upper limit temperature is at 130° C. or lower.

After completing the second temperature control mode, the control unit U1 lowers the stage 34 (S412). Through the above series of operations, the lamination process is completed. After that, the control unit U1 starts the image forming process for the next layer (from S401 onward).

When the above image forming process and the stacking process are repeatedly performed for a required number of times, a desired shaping object is formed on the stage 34.

Finally, the shaping object is removed from the stage 34, and a water-soluble support body is removed from the shaping object by hot water and the like. As a result, it is possible to obtain a desired shaping target object. After the support body is removed, the shaping target object may be further subjected to a prescribed process such as front surface treatment and assembling to obtain a final product.

Advantages of Present Embodiment

According to the above shaping apparatus of the present embodiment, it is possible to convey the material layer to the region outside the preheating unit U4 to reduce the front surface temperature of the material layer before the relationship value of the shaping material reaches the oxidation start threshold. Since it is possible to reduce the temperature of the front surface of the material layer where the air mainly touches, the suppression of the oxidation of the material layer is allowed. With the suppression of the oxidation of the material layer, it is possible to suppress deterioration of physical properties of the shaping material or a change in color of the shaping material, as well as stacking failure caused by the shaping material sticking to the second conveyance belt 30.

In addition, even when the calibration operation, error suspension, and the like of the shaping apparatus occur during the shaping, it is possible to convey the material layer to the region outside the preheating unit U4 before the oxidation of the material layer starts to suppress the oxidation. Therefore, the shaping apparatus is also advantageous in that it is possible to stack the heated material layer as it is without being removed when the shaping apparatus resumes its operation.

Second Embodiment

Figure 9:
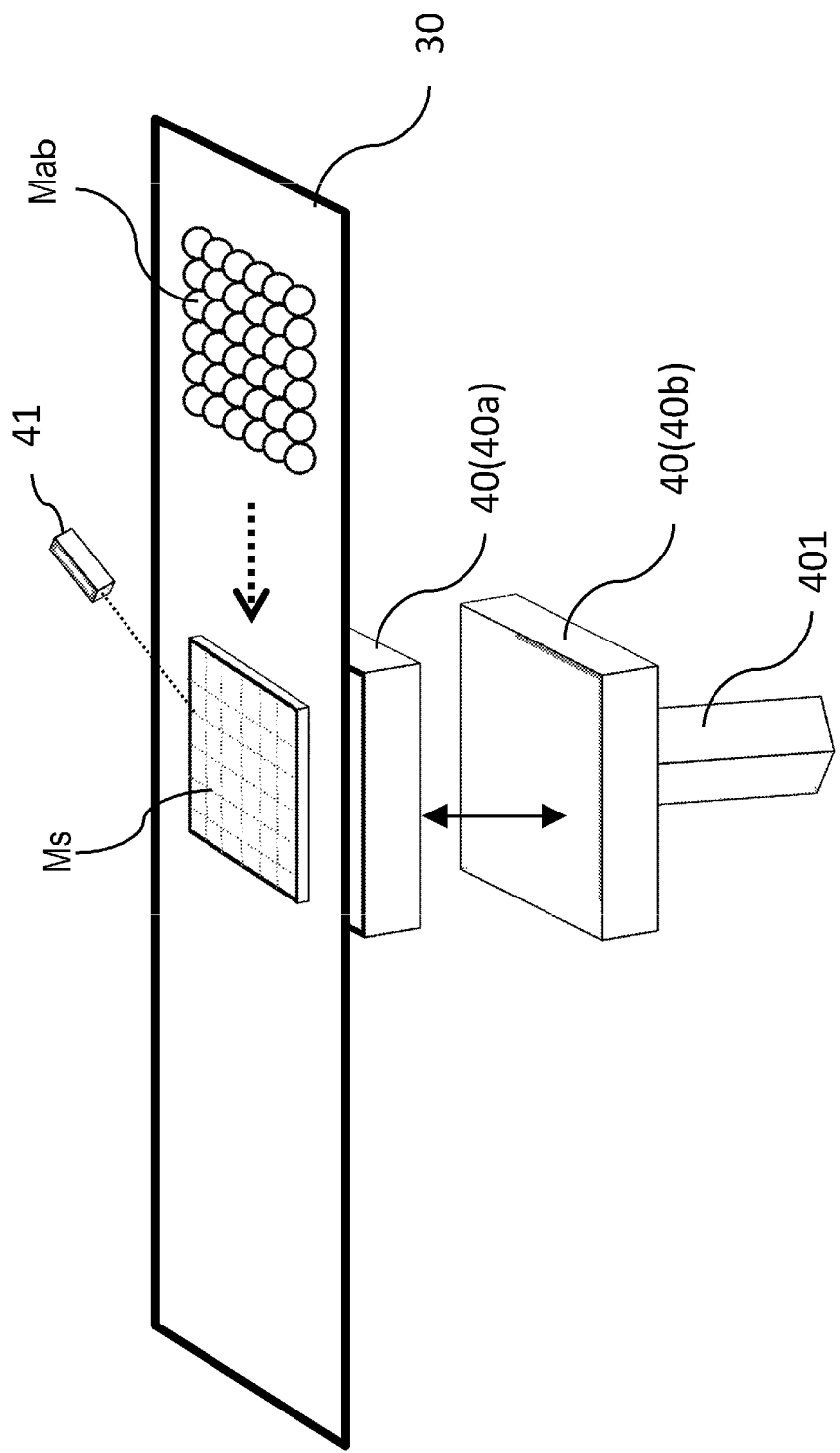
FIG. 9 is a schematic perspective diagram showing the surroundings of the preheating unit of the shaping apparatus according to a second embodiment.

FIG. 9 is a schematic perspective diagram showing the surroundings of the preheating unit U4 of the shaping apparatus according to a second embodiment in an enlarged manner.

In the first embodiment, the second conveyance belt 30 is driven to convey the material layer to the region outside the preheating unit U4 before the relationship value of the shaping material reaches the oxidation start threshold. The second embodiment differs from the first embodiment in that the heating member 40 of the preheating unit U4 is driven to separate from the material layer before the relationship value of the shaping material reaches the oxidation start threshold to reduce the front surface temperature of the material layer and suppress the oxidation. Hereinafter, the descriptions of portions common to the first embodiment will be omitted, and only a configuration peculiar to the present embodiment will be described.

The heating member 40 of the shaping apparatus according to the present embodiment is configured to be movable in a direction perpendicular to the front surface of the second conveyance belt 30 by a driving device 401. As the driving device 401 drives, the heating member 40 is caused to move between a normal position (position denoted by 40a in FIG. 9) at which the material layer on the second conveyance belt 30 is heated and a separated position (position denoted by 40b in FIG. 9) further separated from the material layer on the second conveyance belt 30 than the normal position.

The driving device 401 is an actuator and moves the heating member 40 in the direction perpendicular to the front surface of the second conveyance belt 30 according to an instruction from the control unit U1. As the driving device 401, it is possible to use a piezoelectric element, a screw mechanism, a cylinder mechanism, a piston mechanism, a motor, and the like.

In the present embodiment, the control unit U1 measures the front surface temperature and the heating time of the material layer conveyed to the preheating unit U4 and refers to the oxidation start threshold of the shaping material to drive the driving device 401 before the relationship value of the shaping material reaches the oxidation start threshold to move the heating member 40. At this time, the control unit U1 drives the driving device 401 to move the heating member 40 in the direction perpendicular to the front surface of the second conveyance belt 30.

Thus, the heating member 40 moves from the normal position (position at which the material layer is heated) denoted by 40a in FIG. 9 to the separated position denoted by 40b in FIG. 9.

After that, the heating member 40 returns to the normal position denoted by 40a in FIG. 9 when the material layer is conveyed to the region outside the preheating unit U4.

With the above configuration of the present embodiment, it is also possible to produce the same functions and effects as those of the first embodiment.

Third Embodiment

Figure 10:
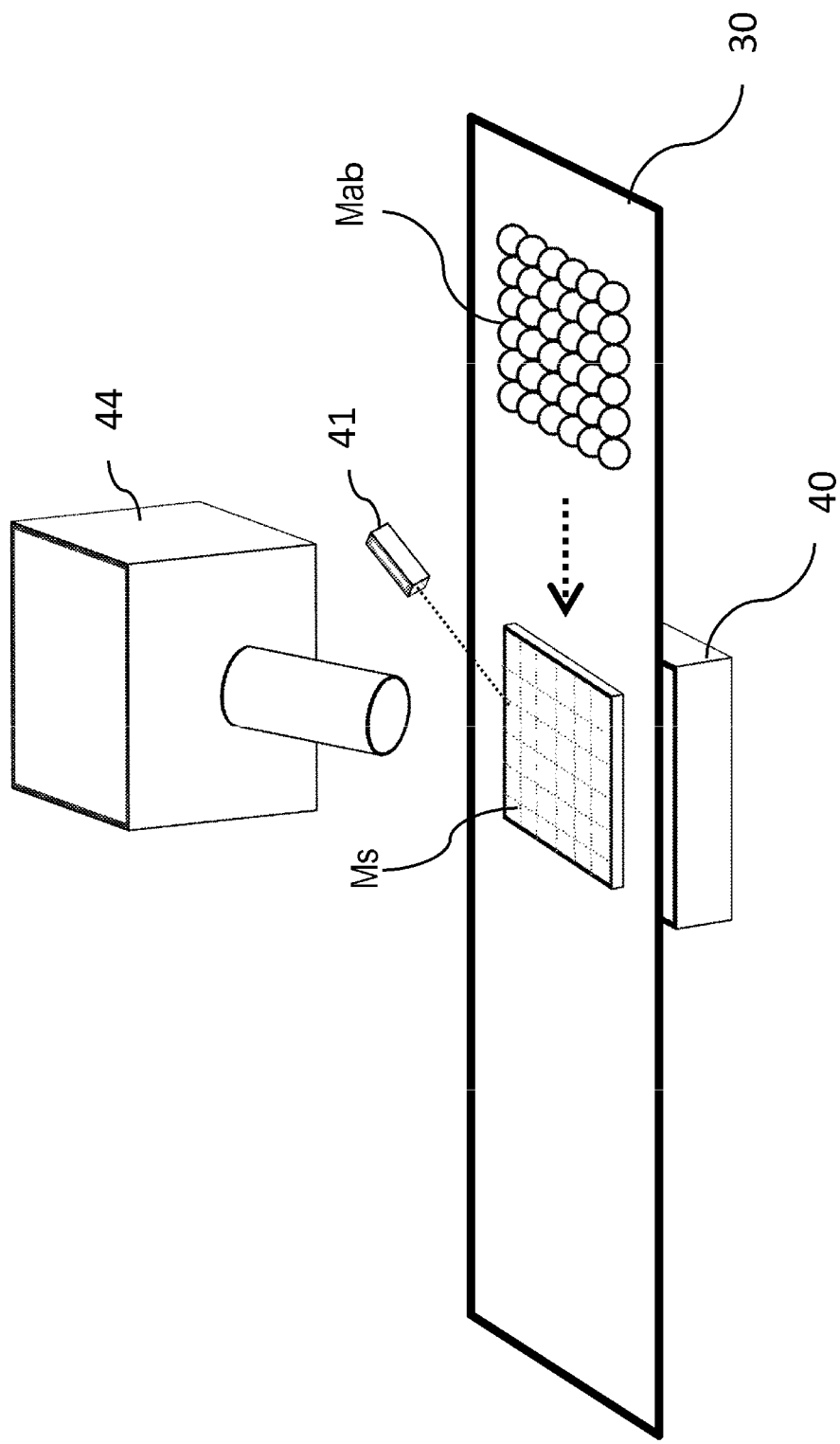
FIG. 10 is a schematic cross-sectional diagram showing the surroundings of the preheating unit of the shaping apparatus according to a third embodiment.

FIG. 10 is a schematic cross-sectional diagram showing the surroundings of the preheating unit U4 of the shaping apparatus according to a third embodiment in an enlarged manner. In the second embodiment, the heating member 40 is caused to separate from the material layer before the relationship value of the shaping material reaches the oxidation start threshold to reduce the front surface temperature of the material layer. In this regard, the third embodiment is different therefrom in that a cooling mechanism 44 is driven before the relationship value of the shaping material reaches the oxidation start threshold to reduce the front surface temperature of the material layer. Hereinafter, the descriptions of portions common to the first and second embodiments will be omitted, and only a configuration peculiar to the present embodiment will be described.

The control unit U1 measures the front surface temperature and the heating time of the material layer conveyed to the preheating unit U4 and refers to the oxidation start threshold of the shaping material to drive the cooling mechanism 44 before the relationship value of the shaping material reaches the oxidation start threshold. As the cooling mechanism, it is possible to use an air-cooling system. The cooling mechanism may be of a type that supplies the air to the material layer with a fan, or may be of a type that supplies the air cooled by a refrigerant and the like to the material layer.

After that, the driving of the cooling mechanism 44 stops when the material layer is conveyed to the region outside the preheating unit U4.

According to the above shaping apparatus of the present embodiment, it is possible to reduce the front surface temperature of the material layer with the air-cooling system and suppress the oxidation of the material layer before the relationship value of the shaping material reaches the oxidation start threshold.

Accordingly, it is possible to produce the same functions and effects as those of the first and second embodiments.

Fourth Embodiment

FIGS. 11A and 11B are schematic cross-sectional diagrams showing the surroundings of the preheating unit U4 of the shaping apparatus according to a fourth embodiment in an enlarged manner. The fourth embodiment is characterized in that a cooling member 45 for cooling the material layer is provided so as to be capable of contacting and separating from the material layer on the second conveyance belt 30. Hereinafter, the descriptions of portions common to the first to third embodiments will be omitted, and only a configuration peculiar to the present embodiment will be described.

As shown in FIGS. 11A and 11B, the preheating unit U4 has the cooling member 45 and a driving device 451 in the present embodiment. The driving device 451 is an actuator and drives the cooling member 45 in the direction perpendicular to the front surface of the second conveyance belt 30 according to an instruction from the control unit U1. As the driving device 451, it is possible to use a piezoelectric element, a screw mechanism, a cylinder mechanism, a piston mechanism, a motor, and the like.

The cooling member 45 is a plate-shaped member formed of metal and the like and arranged to be capable of contacting and separating from the material layer on the second conveyance belt 30 when being driven by the driving device 451. The cooling member 45 is movable in the direction perpendicular to the front surface of the second conveyance belt 30 as the driving device 451 drives, and moves between a standby position shown in FIG. 11A and a contact position (cooling position) shown in FIG. 11B at which the cooling member 45 contacts the material layer. The cooling member 45 is arranged such that its flat portion contacts the material layer when contacting the material layer. At the operation of the shaping apparatus, the cooling member 45 is brought into a cooled state such that it is allowed to reduce the front surface temperature of the material layer when contacting the material layer. At this time, while the cooling member 45 may be brought into a cooled state through radiation, it is also possible to provide a cooling mechanism to cool the cooling member 45 by air-cooling or using a refrigerant. The front surface of the cooling member 45 is preferably formed of a material having heat resistance and high release properties, and a fluorocarbon resin such as perfluoroalkoxy alkan (PFA) and polytetrafluoro ethylene (PTFE) may be used as such.

The control unit U1 measures the front surface temperature and the heating time of the material layer conveyed to the preheating unit U4 and refers to the oxidation start threshold of the shaping material to move the cooling member 45 from the standby position shown in FIG. 11A to the contact position shown in FIG. 11B before the relationship value of the shaping material reaches the oxidation start threshold.

After that, the control unit U1 returns the cooling member 45 to the standby position shown in FIG. 11A before driving the second conveyance belt 30. After the separation of the cooling member 45 from the material layer, the control unit U1 drives the second conveyance belt 30 to convey the material layer to the stacking position.

With the above configuration of the present embodiment, it is also possible to cool the material layer with the cooling member 45 before the relationship value of the shaping material reaches the oxidation start threshold to reduce the front surface temperature of the material layer and suppress the oxidation of the material layer. Accordingly, it is possible to produce the same functions and effects as those of the first to third embodiments.

The preferred first to fourth embodiments of the present invention are described above. However, the present invention is not limited to the embodiments and may be deformed and modified in various ways without departing from its scope.

The above embodiments describe the configuration in which the plurality of conveyance belts is used, but the present invention is not limited to the configuration. For example, the material layer forming unit U2 may be configured to directly form the material layer on the second conveyance belt 30 to remove the first conveyance belt 11.

In addition, the above embodiments describe the configuration of the preheating unit U4 in which the oxidation of the material layer is suppressed when the material layer on the second conveyance belt 30 is heated so as to be formed into a thin film. However, provided that the material layer before being heated by the heater 33 is preheated, it is possible to suppress the oxidation of the material layer by the application of the present invention like the case in which the material layer is heated so as to be formed into a thin film. That is, the present invention is suitably applicable to the configuration in which the shaping material is preheated before being heated by the heater 33 when the shaping material on the second conveyance belt 30 is stacked on the stage 34. Note that a temperature in the preheating section is appropriately set according to the specifications of the apparatus (the fabrication speed of a shaping object and the like).

Moreover, the above first embodiment describes the configuration in which the thin film forming process is performed in a state in which the driving of the second conveyance belt 30 is stopped, but the present invention is not limited to the configuration. When the thin film forming process is performed in the second to fourth embodiments, the driving of the second conveyance belt 30 may be stopped or the second conveyance belt 30 may be continuously driven. For example, in the case where the shaping apparatus has the following configuration, the thin film forming process may be performed in a state in which the second conveyance belt 30 is continuously driven. That is, in this case, the shaping apparatus is configured such that the stage 34 is movable together with the second conveyance belt 30 in a state in which the material layer is sandwiched between the stage 34 and the second conveyance belt 30 when being stacked. In the case where the thin film forming process is performed in a state in which the second conveyance belt 30 is continuously driven, it is possible to use a time at which the material layer passes through the preheating section as a heating time.

Moreover, the above embodiments describe the configuration in which the front surface temperature of the material layer is measured by the temperature measurement section 41, but the present invention is not limited to the configuration. For example, it is also possible to acquire the front surface temperature of the material layer by the measurement of the heating time in a state in which the relationship among the setting temperature of the heating member 40, the heating time of the material layer, and the front surface temperature of the material layer is stored in the storage section of the control unit U1.

Note that the setting temperature of the heating member 40 may be appropriately changed. For example, the setting temperature of the heating member 40 may be reduced or the heating operation of the heating member 40 may be stopped together with the operation of reducing the front surface temperature of the material layer in the above respective embodiments before the relationship value of the shaping material reaches the oxidation start threshold in the thin film forming process. Thus, it is possible to efficiently reduce the front surface temperature of the material layer.

Furthermore, the above embodiments describe the case in which the two types of shaping materials are used, but the present invention is not limited to the case. That is, it is possible to use a plurality of types of shaping materials according to the specifications of the shaping apparatus. In this case, the relationship table showing oxidation start thresholds in FIG. 8 is stored in the storage section so as to correspond to the plurality of types of shaping materials. At its operation, the shaping apparatus performs the above operation of referring to the oxidation start threshold of the relationship table corresponding to the type of a shaping material used to form the material layer to estimate a timing at which the shaping material is oxidized and reducing the front surface temperature of the material layer before the relationship value of the shaping material reaches the oxidation start threshold. In the case where a material layer for one layer is formed of a plurality of shaping materials, the shaping apparatus performs the above operation of reducing the front surface temperature of the material layer before the relationship value of a shaping material assumed to have the earliest oxidation timing among the plurality of shaping materials reaches the oxidation start threshold.

Such a relationship table corresponding to the types of the shaping materials may be automatically changed and set according to the types of the shaping materials in a cartridge when the cartridge accommodating the shaping materials is replaced. Furthermore, the relationship table shown in FIG. 8 is stored in the storage section of the control unit U1, but, without being limited to this, may also be stored in a storage section provided on the side of the cartridge.

Furthermore, it is possible to combine the above respective embodiments together to the utmost extent. For example, the above first to third embodiments may be combined together, or the above second to fourth embodiments may be combined together.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-25809, filed on Feb. 15, 2016, which is hereby incorporated by reference herein in its entirety.

What is claimed is:

1. A shaping method using a shaping apparatus that stacks, based on slice data, a material layer formed of a shaping material to fabricate a solid object, the shaping apparatus having (a) a material layer forming section that forms the material layer based on the slice data, (b) a conveyance body that conveys the material layer formed by the material layer forming section, (c) a stage on which the material layer conveyed by the conveyance body and heated by a heating section is stacked, (d) a preheating section that preheats the material layer on the conveyance body before being heated by the heating section, (e) a temperature acquisition section that a acquires temperature of the material layer preheated by the preheating section, (f) a time measurement section that measures a time at which the material layer on the conveyance body is preheated by the preheating section, and (g) a storage section that stores in advance a relationship between a temperature of the shaping material and a heating time at a time at which oxidation of the shaping material starts as the shaping material is heated, the shaping method comprising:

estimating a timing at which the oxidation of the material layer starts, based on an acquisition result from the temperature acquisition section, a measurement result from the time measurement section, and the relationship stored in the storage section when the material layer on the conveyance body is preheated by the preheating section; and reducing the temperature of the material layer on the conveyance body before the oxidation of the material layer starts.

2. An additive manufacturing method comprising:

a material arranging step of arranging a shaping material on a conveyance body; and a first heating step of heating the shaping material on the conveyance body in an atmosphere containing oxygen; and a transfer step of transferring the shaping material heated on the conveyance body from the conveyance body to a stage, wherein in the first heating step, a heating stage of the shaping material is controlled on the basis of temperature of the shaping material so as to reduce oxidation of the shaping material.

3. The additive manufacturing method according to claim 2, wherein a solid object is fabricated using a plurality of types of shaping material, and wherein the first heating step includes a step of reducing the temperature of the shaping material is before the oxidation of any one of the plurality of types of shaping material starts.

4. A shaping apparatus comprising:

a conveyance body;

an image forming section that arranges a shaping material on the conveyance body;

a heating section that heats the shaping material;

a temperature acquisition section that acquires a temperature of the shaping material heated by the heating section;

a stage that bears the shaping material transferred from the conveyance body; and a control section that controls the heating section on the basis of the temperature of the shaping material acquired by the temperature acquisition section so as to reduce oxidation of the shaping material.

5. The shaping apparatus according to claim 4, wherein the heating section comprises a cooling mechanism that cools the shaping material, and wherein the control section drives the cooling mechanism so as to reduce the temperature of the shaping material before the oxidation of the shaping material starts.

6. The shaping apparatus according to claim 4, further comprising a moving mechanism that moves the heating section, wherein the control section controls the moving mechanism to move the heating section so as to enlarge a distance between the shaping material and the heating section in order to reduce the temperature of the shaping material before the oxidation of the shaping material starts.

7. The shaping apparatus according to claim 4, wherein the control section is configured such that the control section further controls the conveyance body to convey the shaping material so as to move away from the heating section in order to reduce the temperature of the shaping material before the oxidation of the shaping material starts.

8. The shaping apparatus according to claim 4, wherein the temperature acquisition section is a non-contact type temperature sensor.

9. The shaping apparatus according to claim 4, wherein the control section is configured such that the control section further controls stacking of the shaping material on the stage, based on slice data of a shaping target.

10. The shaping apparatus according to claim 4, further comprising a material layer forming section that forms a material layer based on slice data,
wherein the control section controls stacking of the material layer on the stage.

11. The additive manufacturing method according to claim 2, wherein the transfer step includes a step of solidifying the shaping material.

12. The additive manufacturing method according to claim 2, wherein the transfer step includes a second heating step of heating the shaping material on the conveyance body.

13. The additive manufacturing method according to claim 2, wherein in the material arranging step, the shaping material is arranged based on slice data of an object by an electrophotographic process.

14. The additive manufacturing method according to claim 2, wherein in the first heating step, a temperature of the shaping material is controlled referring to oxidation characteristics of the shaping material.

15. The shaping apparatus according to claim 4, wherein the heating section is a ceramic heater or a halogen heater.

16. The shaping apparatus according to claim 4, wherein the temperature acquisition section is a contact-type temperature sensor.

17. The shaping apparatus according to claim 4, wherein the conveyance body is an endless belt laid across in its tensioned state between a plurality of rollers.

18. The shaping apparatus according to claim 4, wherein the conveyance body is formed of polyimide.

19. The shaping apparatus according to claim 4, wherein the image forming section forms the shaping material on the conveyance body by an electrophotographic process.

20. The shaping apparatus according to claim 4, further comprising a member that sandwiches the shaping material on the conveyance body with the stage.

21. The shaping apparatus according to claim 20, wherein the member serves as a heater.

22. The shaping apparatus according to claim 4, wherein the member has a function of reducing the temperature of the shaping material into a solidification temperature.

23. The shaping apparatus according to claim 4, further comprising:
a storage section that stores oxidation characteristics of the shaping material; and
a time measurement section that measures heating time,
wherein the control section controls a heating temperature or the heating time of the heating section referring to the oxidation characteristics of the shaping material.

* * * * *